US007677744B2

(12) United States Patent
Birman et al.

(10) Patent No.: US 7,677,744 B2
(45) Date of Patent: Mar. 16, 2010

(54) RING POINTER ILLUMINATION

(75) Inventors: Vyacheslav Birman, Auburn Hills, MI (US); Werner Eckardt, Rochester, MI (US); Richard Sanders, Clarkston, MI (US); Ronald Struck, Flushing, MI (US)

(73) Assignee: Continental Automotive Systems US, Inc., Aubrun Hills, MI (US)

( * ) Notice: Subject to any disclaimer, the term of this patent is extended or adjusted under 35 U.S.C. 154(b) by 269 days.

(21) Appl. No.: 11/377,572

(22) Filed: Mar. 16, 2006

(65) Prior Publication Data

US 2006/0209525 A1 Sep. 21, 2006

Related U.S. Application Data

(60) Provisional application No. 60/662,928, filed on Mar. 17, 2005.

(51) Int. Cl.
*G01D 11/28* (2006.01)
*B60Q 1/00* (2006.01)
*B60Q 1/26* (2006.01)

(52) U.S. Cl. ............................ 362/29; 362/26; 362/27; 362/28; 362/30; 362/489; 362/509; 362/510; 362/511; 362/512; 362/513; 362/514; 362/515; 362/628

(58) Field of Classification Search ................. 362/489, 362/509–515, 26–30, 628

See application file for complete search history.

(56) References Cited

U.S. PATENT DOCUMENTS

| | | | | |
|---|---|---|---|---|
| 6,224,222 | B1 | 5/2001 | Inoguchi et al. | |
| 6,499,852 | B1 | 12/2002 | Kino et al. | |
| 6,969,834 | B2 * | 11/2005 | Kaji et al. | 362/551 |
| 2006/0219155 | A1 * | 10/2006 | Honma et al. | 116/288 |

FOREIGN PATENT DOCUMENTS

| | | |
|---|---|---|
| DE | 196 17 498 | 11/1997 |
| DE | 101 02 774 | 8/2002 |
| FR | 2 747 776 | 10/1997 |

OTHER PUBLICATIONS http://dictionary.reference.com/browse/ride*
International Search Report dated Nov. 23, 2006.
International Search Report dated Aug. 17, 2006.

* cited by examiner

*Primary Examiner*—Sandra L O'Shea
*Assistant Examiner*—William J Carter

(57) ABSTRACT

An illuminated pointer assembly for a gauge scale having an outer periphery includes a pointer that moves about a periphery of the gauge scale and is illuminated by a light guide. The light guide is disposed on a plane below the pointer and the gauge scale. The light guide includes at least two LEDs that are disposed adjacent first and second ends of the light guide. The light guide also includes a plurality of reflective elements. The plurality of reflective elements is disposed in sets that are orientated with regard to each of the LEDs. The reflective elements provide for the transmission and direction of light within the light guide into the guide body portion of the pointer.

19 Claims, 3 Drawing Sheets

RING POINTER ILLUMINATION

CROSS REFERENCE TO RELATED APPLICATION

The application claims priority to U.S. Provisional Application No. 60/662,928 which was filed on Mar. 17, 2005.

BACKGROUND OF THE INVENTION

This invention generally relates to illuminated gauge dials. More particularly, this invention relates to a light guide for a gauge pointer.

Instrument panels, such as those utilized for automotive applications, utilize illuminated gauges and pointers to improve gauge readability and provide a desirable aesthetic appearance. In some applications it is desirable to mount different gauges on different planes while maintaining independent movement of the pointers associated with each of the separate gauges. In some instances a pointer for indicating on an outer gauge is not attached to rotate about a central point, but is instead driven about the circumference of the gauge.

Illumination of a pointer driven about an outside scale cannot be provided through a centrally arranged light guide. Therefore, a plurality of light emitting diodes are placed about the circumference of the gauge to emit light into the pointer. The pointer includes a reflective surface that directs light as desired.

Disadvantageously, some color LEDs are expensive, such as white and green, and therefore adding additional LEDs of these colors is not an economically desirable alternative. Further, even with a plurality of LEDs disposed about the outer circumference of the gauge, the uniformity of illumination can vary much more than is desired.

Accordingly, it is desirable to design and develop a device for uniformly illuminating a pointer movable outside of a scale that decreases material and assembly costs.

SUMMARY OF THE INVENTION

This invention is a ring pointer assembly including at least two LEDs that transmit light through a light guide to a pointer assembly that moves about an outer periphery of a gauge.

An example ring guide assembly according to this invention includes a light guide that is disposed outside of the outer perimeter of a gauge. A pointer is disposed and rides along the light guide and is illuminated to highlight a reading on the gauge assembly.

The pointer is illuminated and receives light that is transmitted through the light guide. The light guide includes a first end and a second end that are disposed adjacent a first LED and a second LED. The first and second LEDs transmit light circumferentially through the light guide. Light transmitted through the light guide from the LED is reflected by a plurality of reflective surfaces within the light guide transversely into the pointer.

The pointer comprises a guide body portion and a pointer portion. The guide body is disposed such that it receives light from at least two of the reflective surfaces disposed within the light guide. The reflective surface within the guide body reflects light such that it is transmitted through the pointer.

Accordingly, the ring guide assembly according to this invention provides for the transmission of light with a minimal number of LEDs while also allowing for the movement of a pointer about an outer periphery or perimeter of a gauge.

These and other features of the present invention can be best understood from the following specification and drawings, the following of which is a brief description.

DETAILED DESCRIPTION OF THE PREFERRED EMBODIMENT

Figure 1:
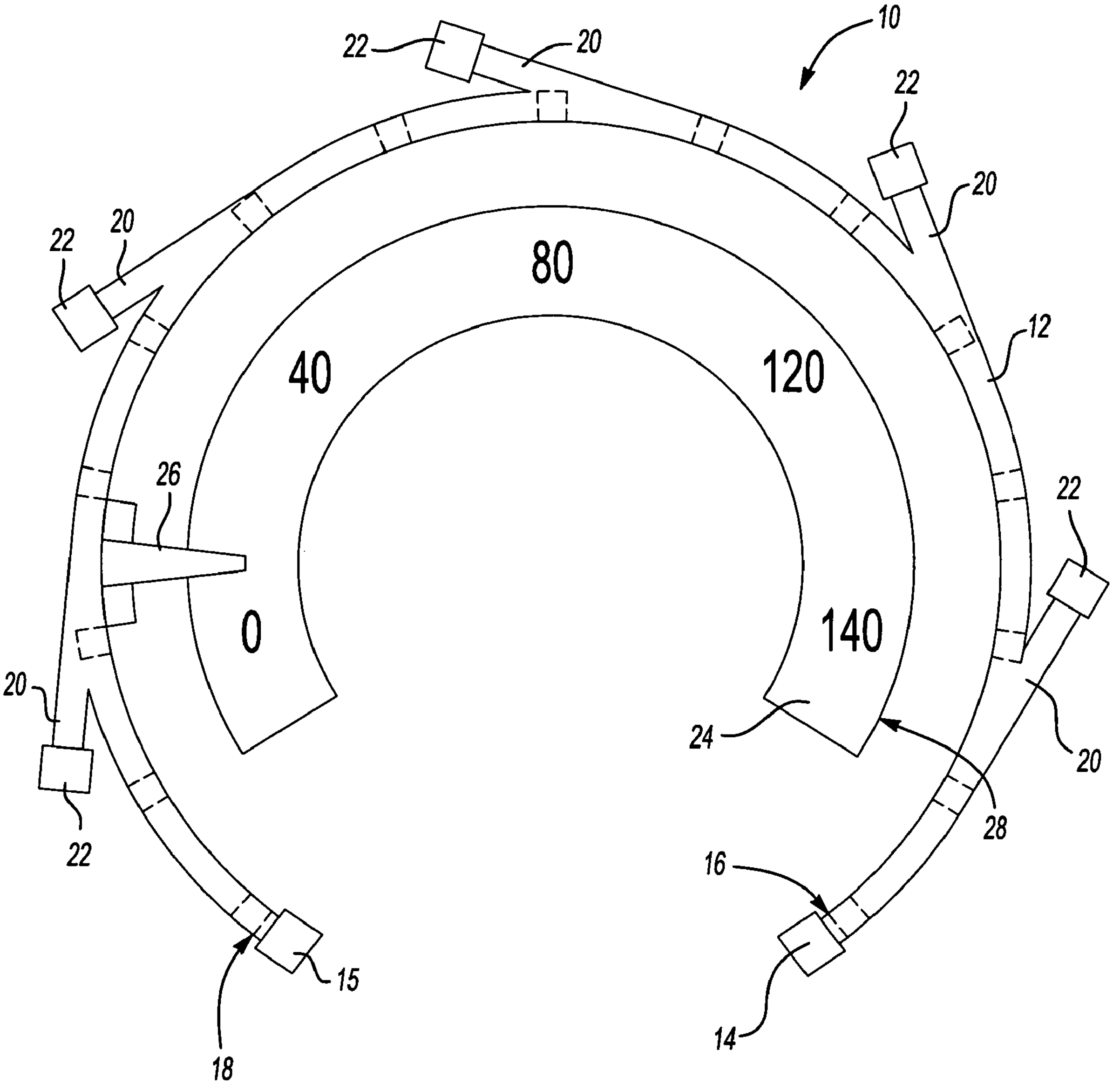
FIG. 1 is a top view of an example ring pointer assembly according to this invention.
Figure 2:
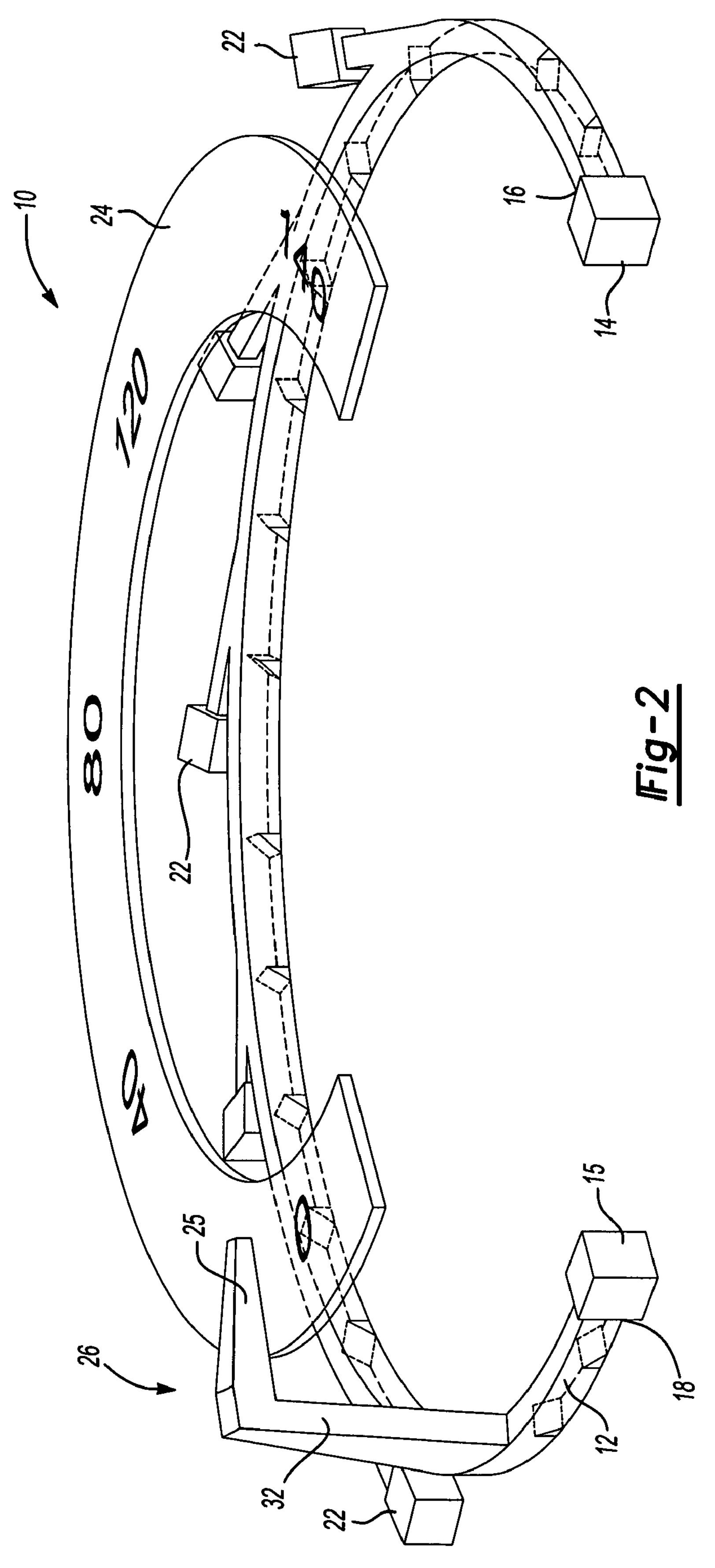
FIG. 2 is a perspective view of the example ring pointer assembly according to this invention.

Referring to FIGS. 1 and 2, an illuminated pointer assembly 10 includes a light guide 12 that is disposed about the outer perimeter of a gauge surface 24. The gauge surface 24 is disposed such that another gauge maybe arranged within a central open portion. A pointer assembly 26 is disposed to move in a path about the outside perimeter 28 of the gauge 24. The light guide 12 is radially spaced apart from the outer perimeter of the gauge 24. The ring guide 12 defines a circumferential path about the outer perimeter of the gauge 24 for the pointer 26.

The light guide 12 includes a first end 16 and a second end 18 that receive light from a corresponding first LED 14 and a second LED 15. Light is transmitted from the first LED 14 and the second LED 15 circumferentially through the light guide 12.

The pointer assembly 26 includes a guide body portion 32 that extends upward from the light guide 12 to a plane disposed above the gauge surface 24 and a pointer 25. The pointer 25 extends from the guide body 32 to overlap the gauge surface 24 and provide the desired visual indication of various reference numerals on the gauge surface 24. As appreciated, any gauge surface or dial as is known to a worker skilled in the art may find benefit with the disclosures described within this patent application.

A gauge surface may include any desired reference numerals or measurement indications for example speed, velocity, temperature or other known measurements desired to be visually indicated to an operator of a vehicle.

The light guide 12 includes the first end 16 and the second end 18 along with a plurality of intermediate ends 20. The intermediate ends 20 are disposed between the first end 16 and the second end 18 and each include an intermediately positioned LED 22. Each of the intermediate ends 20 funnels light from the corresponding intermediate LED 22 into the light guide 12 in a direction that is tangential to the overall circumferential shape of the light guide 12. The tangential orientation provides for the transmission of light from the various intermediate LEDs 22 into the light guide 12 to provide a desired light intensity.

Figure 3:
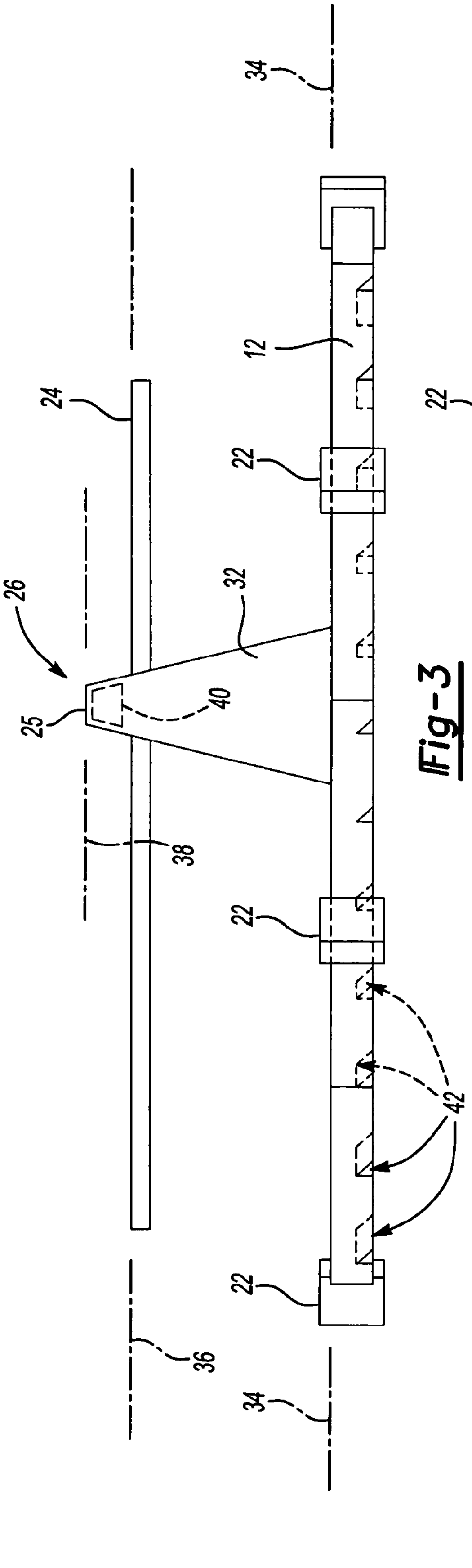
FIG. 3 is a side view of the example ring pointer assembly according to this invention.

Referring to FIG. 3, the ring pointer assembly 10 includes the light guide 12 that is disposed within a first plane 34. The pointer 26 is disposed on a second plane 38 that is disposed above the gauge surface 24. The gauge surface 24 itself is disposed on a third plane 36. The light guide 12 includes a plurality of reflective elements 42. The reflective elements 42 are reflective surfaces that are spaced apart from each of the LEDs 22, 14, 15.

Light transmitted within the light guide 12 is reflected transversely upward into the guide body 32 of the pointer assembly 26. This reflection of light provides for the transmission of reflected light to provide a constant or desired light upon a reflective surface 40 of the pointer assembly 26. The reflective surface 40 in turn transmits light in a transverse manner along the pointer 25.

Accordingly, light is transmitted first through the light guide 12 and then reflected transversely upward into the guide body 32 of the pointer 26. This upward reflection is accomplished by the plurality of reflective elements 42 disposed along the light guide 12 and spaced apart from the LEDs 22, 14, 15. The guide body 32 receives light from at least two of the reflective elements 42. Preferably, many more of the reflective elements 42 transmit light into the guide body 32 for any position of the pointer assembly 16 such that a consistent uniform density of light is received on the reflective surface 40. Light that is reflected upwardly from the light guide 12 onto the reflective surface 40 is then again transmitted in a transverse matter along the length of the pointer 25.

The pointer 25 includes a coating that provides for the illumination of the pointer without transmitting light out of the pointer 25 and onto the gauge surface 24. As appreciated, coatings as are known in the art to provide the desired illumination and direction of light while inhibiting light from being transmitted in an undesirable direction can be utilized with the pointer 25.

Figure 4:
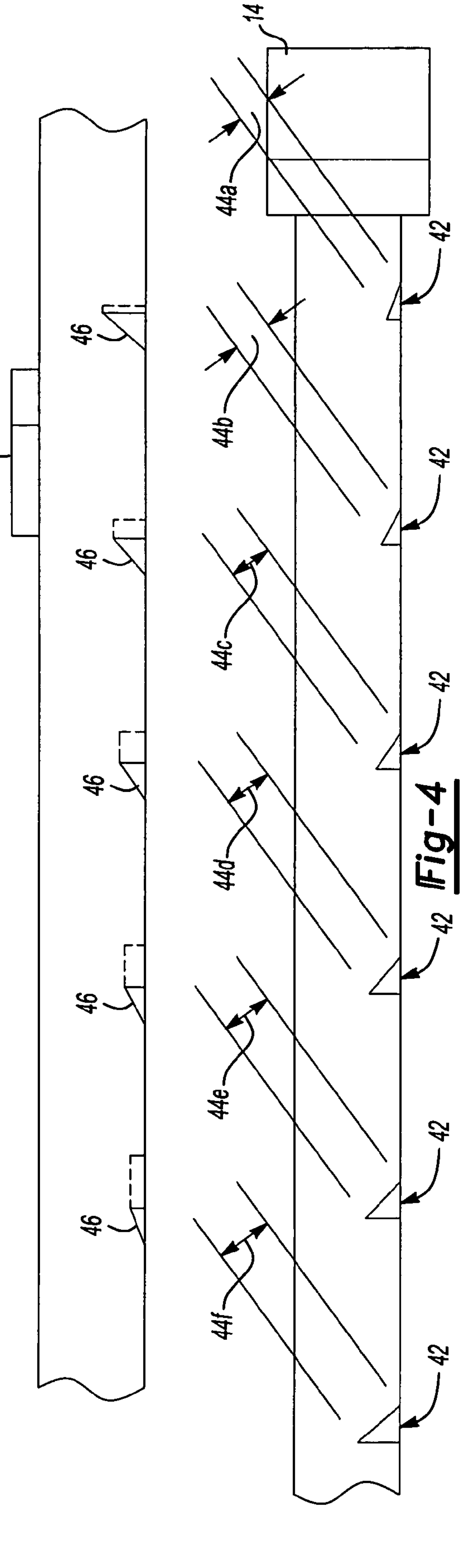
FIG. 4 is an enlarged side view of an example light guide according to this invention.

Referring to FIG. 4, each of the reflective elements 42 includes a reflective surface 46. The reflective surfaces 46 include a length 44. The length 44 is varied in relation to the position of each individual reflective element 42 from the corresponding LED 22, 14, 15. In order to provide the desired light intensity emitted from each of the LEDs 22, the length 44*a*, 44*b*, 44*c*, 44*d*, 44*e*, and 44*f* of each of the reflective surface 46 for the reflective elements is varied. The length 44*a*, 44*b*, 44*c*, 44*d*, 44*e*, and 44*f* of the reflective surfaces 46 varies to provide the desired transmission and transverse reflection of light into the guide body 32.

The length 44*a*, 44*b*, 44*c*, 44*d*, 44*e*, and 44*f* of the reflective surface 46 vary in relation to the distance from the corresponding LED 22, 15, 14. A reflective surface 46 disposed adjacent the LED 14 has a length 44*a* that is the smallest. As the reflective elements are spaced further apart from the LED the length of the reflective surface 46 is increased. Accordingly, the length 44*a* is one of the smaller lengths. The length 44*a* is part of the reflective element 42 that is disposed significantly or substantially adjacent the LED 14. Subsequently, further spaced apart reflective elements 42 include subsequently and progressively longer lengths of reflective surfaces 46 up to the longest length reflective surface 44*f*. This pattern repeats through out the light guide 12 in association with each of the specific and independent LEDs 22, 14, 15.

Referring back to FIG. 1, the example embodiment discussed and described herein includes a plurality of LEDs 14, 15, 22. The specific number of LEDs is only required to provide the desired light intensity for a specific application. As appreciated, the number and orientation of the LEDs can differ to provide for application specific requirements. However, the inventive aspects of this invention can be performed with only the first LED 14 and the second LED 15.

Accordingly, the ring pointer assembly 10 according to this invention provides for a reduced number of LEDs while still providing the desired consistent illumination of the pointer no matter what radial position the pointer may be in. Further, the illuminated ring assembly provides for the use of only two LEDs while still providing an increased number of light reflections that are transmitted and received by the guide body of the pointer assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated pointer assembly comprising:

a scale including an outer periphery;

a pointer for movement outside of the outer periphery of the scale;

a light guide including a first end, a second end, and at least one intermediate end, at least one light emitting diode (LED) disposed at each of the first end, the second end, and the at least one intermediate end for transmitting light through the light guide, wherein light in the light guide is directed through a top surface of the light guide to illuminate the pointer and the pointed supported by the light guide and the pointer moves along and relative to the top surface of the light guide during movement about the scale, wherein the intermediate end extends tangentially from the light guide.

2. The assembly as recited in claim 1, wherein the light guide comprises a circumferential path for movement of the pointer outside the outer periphery of the scale.

3. The assembly as recited in claim 1, wherein the pointer comprises a guide body receiving light from the light guide, and a reflective surface directing light from the guide body into the pointer.

4. The assembly as recited in claim 3, wherein the pointer is disposed on a first plane and the light guide is disposed on a second plane spaced apart from the first plane.

5. The assembly as recited in claim 4, wherein the scale is disposed on a third plane space apart from both the first plane and the second plane.

6. The assembly as recited in claim 3, wherein the light guide includes a plurality of reflective elements for reflecting light transversely through a top surface of the light guide into the guide body.

7. The assembly as recited in claim 6, wherein the guide body receives light from at least two reflective elements of the light guide.

8. The assembly as recited in claim 7, wherein the number of reflective elements is greater than the number of LEDs.

9. The assembly as recited in claim 6, wherein each of the reflective elements include a reflective surface including a length, and at least two of the plurality of reflective elements include different lengths.

10. The assembly as recited in claim 9, wherein the lengths vary relative to a distance from one of the at least two LEDs.

11. The assembly as recited in claim 10, wherein the lengths of the reflective surfaces increase with greater distance from the LED.

12. The assembly as recited in claim 1, including a plurality of intermediate ends disposed between the first end and the second end, wherein each intermediate end extends tangentially from the light guide and includes an LED for transmitting light into the light guide.

13. The assembly as recited in claim 12, wherein each of the first end, second end and intermediate ends includes a dedicated set of reflective elements, and each set of reflective elements includes varying lengths of reflective surfaces.

14. The assembly as recited in claim 13, wherein the varying lengths of reflective surfaces increases with increased distance from the corresponding LED.

15. An illuminated gauge assembly comprising:

a dial face including a scale and outer perimeter;

a light guide disposed outside the outer perimeter of the dial face, the light guide including a first end for receiving light from a first LED and a second end for receiving light from a second LED, the light guide including a top surface through which light is transmitted; and a pointer assembly supported by and moves relative to the light guide for movement on the top surface of the light guide about the path defined by the light guide outside the outer perimeter of the dial face for indicating a current condition on the scale.

16. The assembly as recited in claim 15, including a plurality of reflective elements associated with each of the first LED and the second LED for directing light into the pointer assembly.

17. The assembly as recited in claim 16, wherein each of the reflective elements includes a length of reflective surface and the length of the reflective surface varies with respect to a distance from a corresponding one of the first LED and the second LED.

18. The assembly as recited in claim 16, wherein the pointer assembly includes a guide body that rides on the light guide and directs light from the light guide through the pointer, wherein the guide body includes a width that overlaps at least two of the plurality of reflective surfaces at any position along the light guide.

19. The assembly as recited in claim 15, wherein the light guide includes a plurality of intermediate ends each disposed adjacent a corresponding LED.

* * * * *